Jan. 8, 1935.   J. E. ALBERT   1,987,354
CIGARETTE HOLDER
Filed June 14, 1932

Inventor
JOHN E. ALBERT

Patented Jan. 8, 1935

1,987,354

UNITED STATES PATENT OFFICE 1,987,354

CIGARETTE HOLDER

John E. Albert, Columbus, Ohio

Application June 14, 1932, Serial No. 617,156

2 Claims. (Cl. 131—10)

It appears to be the fact that many women and some men have a desire to eat a piece of highly flavored candy after smoking a cigarette. The reason or cause for this fact may be diverse.

The object of the invention is to provide a cigarette holder, or the like, constructed of hard highly flavored candy or other edible substance, such for example, as that used in the manufacture of "life savers" so that it may be used for one or more "smokes" and then the holder or a portion thereof taken into the mouth and crushed, dissolved and swallowed or ejected according to the material used or the desire of the smoker.

A further object of the invention is to impart flavor to the smoke and in some cases to use the smoke from the cigarette as a vehicle for conveying a medicament from the substance of the holder to the respiratory organs. Other objects will appear from the disclosure herein.

The holder may be embodied in any usual or suitable form. It is the material and structure that are important in carrying out the concept.

In the accompanying drawing—

Figure 1:
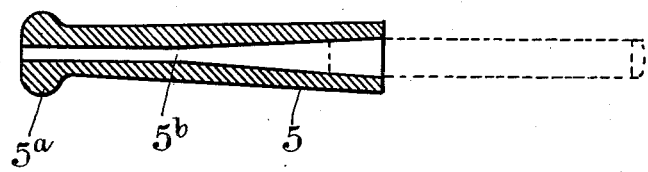
Figure 1 illustrates in longitudinal sectional view one form in which my invention may be embodied.

In Fig. 1 the body 5 of the holder is made in plain flared form having an enlarged mouth piece 5ª and with the duct or smoke passage 5ᵇ also flaring to receive a cigarette, as shown by broken lines.

Figure 2:
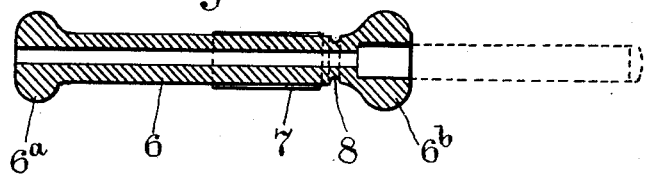
Fig. 2 illustrates a similar view of a second form.

In Fig. 2 the body 6, intermediate the ends, is substantially cylindrical, one end being the enlarged mouth piece 6ª and the other expanded as at 6ᵇ formed with a cross sectional enlargement of the smoke passage to receive the cigarette.

Generally, a portion of the holder can be lined externally with a band of paper or other suitable non-edible material slightly adherently but removably attached thereto, if desired, as exemplified at 7 (Fig. 2) where the holder may be held with the fingers to prevent soiling the candy or softening the same by moisture due to the contact of the fingers. The holder can be provided with a peripheral scoring or groove as shown at 8 to make it easily frangible thereat in the event one end is more charged with nicotine or with smoke deposit than the other. In such event the smoker can reject either end if desired. One of the portions beyond the scoring can be of non-edible material.

Where the candy is highly flavored with suitable essences, such as commonly used in candy the deposited smoke will be more or less flavored with the essence and so rendered desirable to some smokers and perhaps unobjectionable to others when the candy is eaten.

The forms and materials of the parts can be changed without departing from the gist of the invention as claimed.

What I claim is:

1. A cigarette holder for smoking purposes constructed of a hard edible substance and having a peripheral groove or scoring therein to render the holder more frangible at said groove or scoring.

2. A cigarette holder for smoking purposes consisting of a draft tube open from end to end, the interior wall forming said tube made of a suitable edible substance, such as flavored hard candy, said tube having one end internally shaped to receive and retain a cigarette, and the other end of said tube adapted to serve as a mouth piece for the smoker whereby the smoke and heated air from the cigarette in its passage through said tube to the mouth of the smoker contact with said interior wall of said tube and are flavored thereby.

JOHN E. ALBERT.